(12) United States Patent
Vollert et al.

(10) Patent No.: US 12,485,868 B2
(45) Date of Patent: Dec. 2, 2025

(54) METHOD FOR REDUCING A BOOST TO THE BRAKING FORCE IN THE EVENT OF AN ERROR

(71) Applicant: Robert Bosch GmbH, Stuttgart (DE)

(72) Inventors: Herbert Vollert, Vaihingen/Enz (DE); Jochen Wagner, Moeglingen (DE)

(73) Assignee: ROBERT BOSCH GMBH, Stuttgart (DE)

( * ) Notice: Subject to any disclaimer, the term of this patent is extended or adjusted under 35 U.S.C. 154(b) by 37 days.

(21) Appl. No.: 18/550,998

(22) PCT Filed: Mar. 7, 2022

(86) PCT No.: PCT/EP2022/055690
§ 371 (c)(1),
(2) Date: Sep. 18, 2023

(87) PCT Pub. No.: WO2022/268367
PCT Pub. Date: Dec. 29, 2022

(65) Prior Publication Data
US 2024/0166187 A1    May 23, 2024

(30) Foreign Application Priority Data
Jun. 23, 2021    (DE) .................... 10 2021 206 459.0

(51) Int. Cl.
*B60T 13/74*    (2006.01)
*B60T 8/171*    (2006.01)
*B60T 17/22*    (2006.01)

(52) U.S. Cl.
CPC ............ *B60T 17/221* (2013.01); *B60T 8/171* (2013.01); *B60T 2270/402* (2013.01); *B60T 2270/403* (2013.01); *B60T 2270/406* (2013.01); *B60T 2270/413* (2013.01)

(58) Field of Classification Search
CPC ............................... B60T 13/745; B60T 17/22
See application file for complete search history.

(56) References Cited

U.S. PATENT DOCUMENTS

| | | | |
|---|---|---|---|
| 6,149,248 A * | 11/2000 | Lubbers | B60T 7/042 303/114.1 |
| 10,023,166 B2 * | 7/2018 | Takeda | B60T 8/171 |
| 2010/0263367 A1 * | 10/2010 | Drumm | B60T 13/162 60/545 |

(Continued)

FOREIGN PATENT DOCUMENTS

| | | |
|---|---|---|
| JP | 2019006335 A | 1/2019 |
| WO | 2020025373 A1 | 2/2020 |

OTHER PUBLICATIONS

International Search Report for PCT/EP2022/055690, Issued Jun. 22, 2022.

*Primary Examiner* — Long T Tran
(74) *Attorney, Agent, or Firm* — NORTON ROSE FULBRIGHT US LLP

(57) ABSTRACT

So that an impermissibly high brake pressure in a hydraulic power vehicle brake system (1) having a slip control system (9) is prevented in the event of an error, the invention proposes hydraulic function signals (14, 15), upon the presence of which the generation of a brake pressure or a boost to the brake pressure is reduced if an electronic function signal of a power brake pressure generator (2, 10) is absent.

5 Claims, 2 Drawing Sheets

(56) References Cited

U.S. PATENT DOCUMENTS

| | | | |
|---|---|---|---|
| 2011/0168502 A1* | 7/2011 | Linhoff | B60T 13/588 |
| | | | 303/3 |
| 2015/0283987 A1* | 10/2015 | Bareiss | B60T 8/171 |
| | | | 701/70 |
| 2016/0059836 A1* | 3/2016 | Kim | B60T 8/4081 |
| | | | 303/10 |
| 2016/0193990 A1* | 7/2016 | Drumm | B60T 8/4077 |
| | | | 701/70 |
| 2018/0022335 A1 | 1/2018 | Kunz et al. | |
| 2018/0126969 A1 | 5/2018 | Blattert et al. | |
| 2018/0194332 A1* | 7/2018 | Watanabe | B60T 7/12 |
| 2019/0135258 A1* | 5/2019 | Chuang | B60T 13/662 |
| 2020/0023823 A1* | 1/2020 | Baehrle-Miller | B60T 8/321 |
| 2020/0114888 A1* | 4/2020 | Michels | B60T 8/4077 |
| 2020/0324751 A1* | 10/2020 | Englert | B60T 17/221 |
| 2021/0129817 A1* | 5/2021 | Michels | B60T 13/142 |

* cited by examiner

METHOD FOR REDUCING A BOOST TO THE BRAKING FORCE IN THE EVENT OF AN ERROR

FIELD

The present invention relates to a method for reducing a boost to the braking force of an, in particular hydraulic, vehicle brake system.

BACKGROUND INFORMATION

For automobiles, hydraulic vehicle brake systems having a slip control system, such as an anti-lock brake system (ABS), traction control system (TCS) or vehicle dynamics management (VDM), are conventional. Such vehicle brake systems typically have a master brake cylinder, which can be actuated via a foot brake pedal using muscular power and which has a brake booster. The slip control system conventionally has a hydraulic pump, which may likewise boost the braking force in the event of a failure of the brake booster. A problem with such vehicle brake systems may arise if an electrical or electronic function signal which signals the proper functioning of the brake booster fails—for example, as a result of a break in a signal cable. In this case, the hydraulic pump of the slip control system boosts the braking force even though the brake booster is functional, i.e. both the brake booster and the slip control system boost the braking force. Controlled braking is barely still possible or is at least more difficult.

SUMMARY

An object of the present invention is to prevent an error-related double boost to the braking force, to reduce the boost to the braking force to a normal amount or even below this amount or to reduce the boost the braking force to the extent that controlled braking is possible. According to an example embodiment of the present invention, a hydraulic function signal is transmitted from a brake booster or a brake pressure generator to a slip control system of an, in particular hydraulic, vehicle brake system and/or, conversely, from the slip control system to the brake booster or brake pressure generator. The hydraulic function signal is preferably transmitted in addition to an electrical or electronic function signal, it being possible to transmit the hydraulic function signal via existing brake lines and brake-fluid-conducting bores in the vehicle brake system. Separate hydraulic lines for transmitting the function signal are not necessary, although the present invention does not rule them out.

If the hydraulic function signal signals a boost to the braking force by the brake booster or the generation of a brake pressure by the brake pressure generator, the braking force is not boosted by a power brake pressure generator of a slip control system of the vehicle brake system—not even if, for example, a fault in the brake booster or the brake pressure generator is signaled electronically—or the boost to the braking force by the power brake pressure generator of the slip control system and/or the brake booster is at least reduced.

Conversely, according to an example embodiment of the present invention, the boost to the braking force by the brake booster is switched off or at least reduced if a hydraulic function signal of the slip control system signals a boost to the braking force by the power brake pressure generator of the slip control system.

To carry out the method according to an example embodiment of the present invention, the vehicle brake system has a controllable brake booster. "Controllable" means that the boost to the braking force can be controlled or regulated. In the case of a vacuum brake booster, this may take place via a solenoid valve, for example, with which a pressure in a working chamber or a vacuum chamber, or a pressure difference between the working chamber and the vacuum chamber, can be controlled. According to the present invention, the vehicle brake system preferably has an electromechanical brake booster, which boosts the braking force in particular via an electric motor or an electromechanical linear actuator. Electromechanical brake boosters provide the option of controlling or regulating the boost to the braking force electronically.

According to an example embodiment of the present invention, instead of the brake booster, the vehicle brake system may also have a first power brake pressure generator, which generates a brake pressure using external energy. In this case, the level of the brake pressure generated by the first power brake pressure generator is reduced, or the first power brake pressure generator is switched off, if the hydraulic function signal signals a boost to the brake pressure or the generation of a brake pressure by a second power brake pressure generator of the slip control system. A vehicle brake system having a controllable brake booster and, in addition, a first power brake pressure generator is possible.

Besides the brake booster or the first power brake pressure generator, the vehicle brake system has a slip control system having a second power brake pressure generator to carry out the method according to the present invention. Such slip control systems are, for example, anti-lock brake systems (ABS), traction control systems (TCS) or vehicle dynamics management (VDM). Such slip control systems are conventional and are not explained here.

Further developments and advantageous configurations of the present invention are disclosed herein.

An example configuration of the present invention provides for the hydraulic function signal to be modulated onto a brake pressure. This means that the function signal is added to the brake pressure. The function signal is, for example, a pressure fluctuation. The hydraulic function signal should differ through the actuation of the vehicle brake system in a manner clearly shown by brake pressure curves, and should compromise braking to the minimum extent possible and have the minimum possible feedback effect on a foot brake pedal, for example.

It is readily possible to generate the function signal by controlling or regulating the boost to the braking force by the controllable brake booster or by controlling or regulating the first power brake pressure generator. If the second power brake pressure generator has a piston pump, the brake pressure thereof, which pulsates due to its intermittent delivery, may be used as a function signal.

All of the features disclosed in the description and in the figures may be implemented alone or in essentially any combination in specific embodiments of the present invention. Embodiments of the present invention which include only one or multiple features of a specific embodiment of the present invention, rather than all features, are essentially possible.

BRIEF DESCRIPTION OF THE DRAWINGS

The present invention is explained below with reference to the figures.

Essentially, the same parts are denoted by the same reference numerals in the figures.

DETAILED DESCRIPTION OF EXAMPLE EMBODIMENTS

Figure 1:
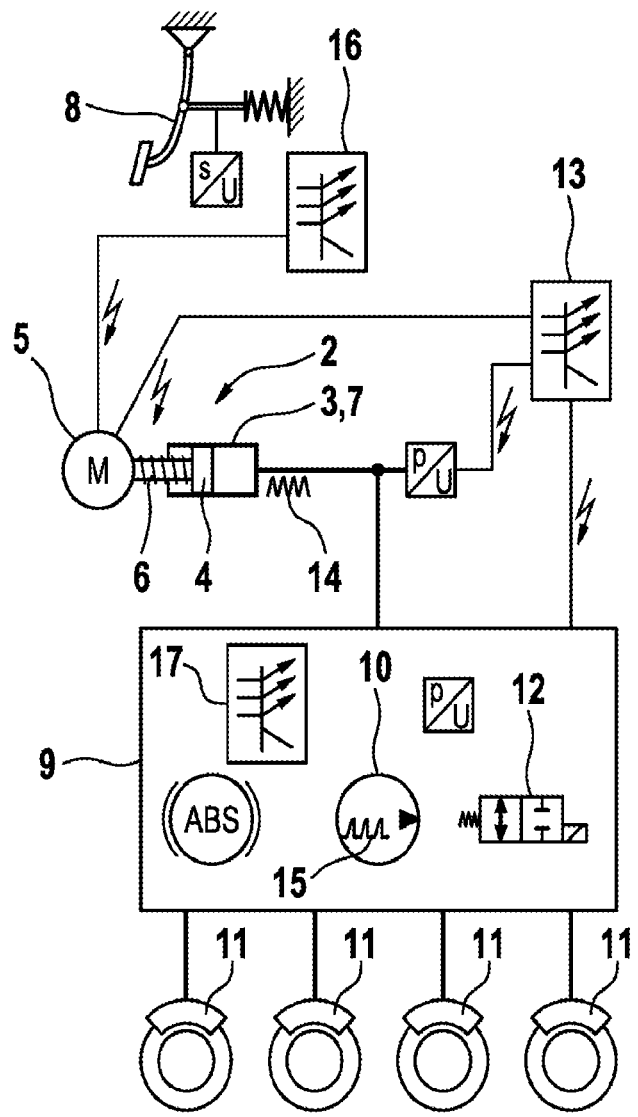
FIGS. 1 and 2 show schematic and simplified circuit diagrams of two hydraulic vehicle brake systems for automobiles, with which the method according to the present invention is carried out.

The vehicle brake system 1 depicted in schematic and simplified form in FIG. 1 is a hydraulic power vehicle brake system for an automobile. In the exemplary embodiment, it is designed as a dual-circuit power vehicle brake system 1 and has four hydraulic wheel brakes 11, of which two are associated with one brake circuit in each case.

To generate a brake pressure using external power for service braking, the vehicle brake system 1 has a first power brake pressure generator 2. In the exemplary embodiment, the first power brake pressure generator 2 has a piston-cylinder unit 3 whereof the piston 4 can be displaced in a cylinder 7 by an electric motor 5 via a screw drive 6, for example a ball screw (recirculating ball gear). A reducing gear (not depicted), for example a planetary gear, may be interconnected between the electric motor 5 and the screw drive 6. Other power brake pressure generators having, for example, a hydraulic pump driven by an electric motor are also possible (not depicted).

The first power brake pressure generator 2 generates a brake pressure depending on a pedal travel or a pedal force of a foot Substitute Specification brake pedal 8 or, alternatively, a hand brake lever (not depicted). Service braking using external power is the intended brake actuation for a functional vehicle brake system 1.

A slip control system 9 is connected to the first power brake pressure generator 2, strictly speaking to the cylinder 7 of the piston-cylinder unit 3 of the first power brake pressure generator 2, which slip control system comprises, for example, an anti-lock brake system (ABS), a traction control system (TCS) and/or vehicle dynamics management (VDM). Such control systems are conventional and are not explained here.

The slip control system 9 has a second power brake pressure generator 10, which, in the exemplary embodiment, has a hydraulic pump in each brake circuit to generate a brake pressure and to deliver brake fluid during slip control. The hydraulic pumps are driven by a common electric motor. The second power brake pressure generator 10 is depicted symbolically in the drawing by the circuit sign for a hydraulic pump. To control the brake pressure in the vehicle brake system 1, in the brake circuits and/or—individually for each wheel—in the wheel brakes 11, the slip control system 9 has inlet valves, outlet valves and further valves 12. The valves 12 (also the inlet valves and the outlet valves) are depicted symbolically in the drawing by the circuit sign for a solenoid valve.

The wheel brakes 11 are connected to the slip control system 9. In the event of a failure of the first power brake pressure generator 2, a brake pressure for actuating the vehicle brake system 1 is generated by the second power brake pressure generator 10 of the slip control system 9. This is so-called auxiliary braking.

The generation of a brake pressure and the slip control are controlled or regulated by a central electronic control unit 13.

If an electronic function signal which indicates a function of the first power brake pressure generator 2, i.e. the generation of a brake pressure by the first power brake pressure generator 2, fails as a result of a break in an electric cable, for example, the brake pressure is generated by the second power brake pressure generator 10. With a functioning first power brake pressure generator 2, the second power brake pressure generator 10 would increase the brake pressure of the first power brake pressure generator 2 to a possibly impermissible value, which might damage the vehicle brake system 1.

To prevent this, the present invention provides second, redundant function signals, which signal the functions, i.e. the generation of a brake pressure by the two power brake pressure generators 2, 10, to the other power brake pressure generator 10, 2 in each case, specifically on a different, redundant path: each of the two power brake pressure generators 2, 10 generates a hydraulic function signal 14, 15 when it generates a brake pressure. The function signal is modulated onto the generated brake pressure and thus relayed through brake lines, brake-fluid-conducting bores and the like.

In the exemplary embodiment, the first power brake pressure generator 2 is operated in such a way that, in addition to the brake pressure which it generates, it generates a, for example sinusoidal, pressure fluctuation. An amplitude of the pressure fluctuation is small so that it does not disrupt the operation of the vehicle brake system 1.

In the exemplary embodiment, the second power brake pressure generator 10 has piston pumps as hydraulic pumps, which, owing to their delivery being periodically interrupted by a piston stroke, cause a characteristic pulsating pressure signal, which is used as a second function signal 15 for signaling the function of the second power brake pressure generator 10.

Other hydraulic function signals are also possible and are configured, in particular, in such a way that they do not impair the function of the vehicle brake system 1, or impair it to the minimum extent possible, have no feedback effect, or only the minimum possible feedback effect, on a driver of the vehicle and can be differentiated via brake pressure curves during the operation of the vehicle brake system.

The hydraulic function signals 14, 15 of the two power brake pressure generators 2, 10 are processed by decentralized electronic control units 16, 17. If the electronic function signal of one of the two power brake pressure generators 2, 10 is absent but the hydraulic function signal 16, 17 of this power brake pressure generator 2, 10 is present, the other power brake pressure generator 10, 2 in each case is not operated or the brake pressure generated by the other power brake pressure generator 10, 2 is in any event reduced to prevent damage to the vehicle brake system 1 and to enable controlled actuation of the vehicle brake system 1.

Figure 2:
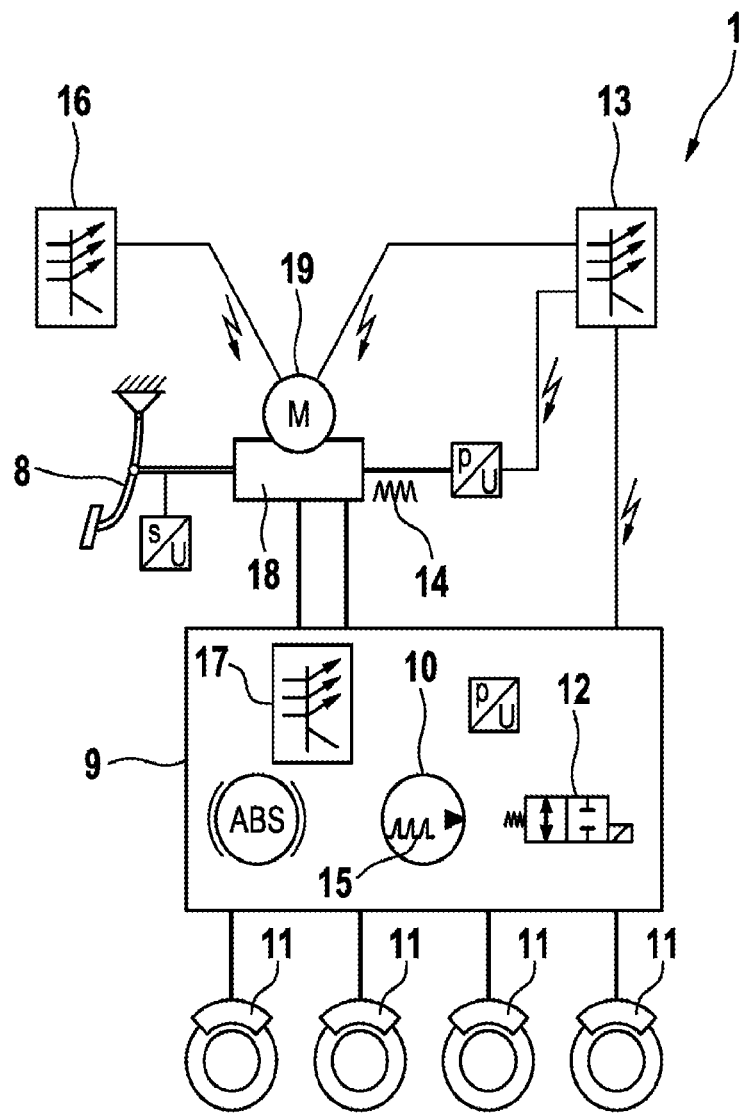

FIG. 2 shows the vehicle brake system 1 with a master brake cylinder 18 which can be actuated by the foot brake pedal 8 instead of the first power brake pressure generator 2. The master brake cylinder 18 has an electromechanical brake booster 19, which is depicted symbolically in the drawing by the circuit sign for an electric motor. The brake booster 19 can be electronically controlled or regulated, i.e. its brake boosting effect can be set or adjusted. Other brake boosters which can be controlled or regulated, for example a vacuum brake booster, are also possible, for which the pressure in a working chamber or a vacuum chamber, or a pressure difference between the two chambers, can be controlled or regulated via a solenoid valve, for example.

Upon an actuation of the vehicle brake system with the master brake cylinder 18, the brake booster 19 boosts the braking force and the brake booster 19 is activated in such a way that it generates the hydraulic function signal 14, i.e. modulates a pressure fluctuation onto the generated brake pressure, for example. If the electronic function signal of the second power brake pressure generator 10 is absent but the hydraulic function signal 15 of the second power brake pressure generator 10 is present, the boost to the braking force by the brake booster 19 is reduced or the brake booster 19 is switched off.

If the electronic function signal of the first power brake pressure generator 2 or the brake booster 19 is absent when the hydraulic function signal 14 of the first power brake pressure generator 2 or the brake booster 19 is present, the second power brake pressure generator 10 is switched off or not operated, or the generation of a brake pressure thereby, i.e. the level of the brake pressure generated by the second power brake pressure generator 10, or the brake boosting effect thereof, is in any case reduced.

What is claimed is:

1. A method for reducing a boost to a braking force of a vehicle brake system, which has a controllable brake booster or a first power brake pressure generator, and a slip control system having a second power brake pressure generator, the method comprising the following steps:

transmitting by the brake booster or the first power brake pressure generator and/or the second power brake pressure generator, a hydraulic function signal; and upon a presence of the hydraulic function signal, reducing or switching off a boost to the braking force by the first brake booster or generation of a brake pressure by the first power brake pressure generator or generation of a brake pressure or a boost to the braking force by the second power brake pressure generator.

2. The method as recited in claim 1, wherein the function signal is modulated onto a brake pressure.

3. The method as recited in claim 1, wherein the second power brake pressure generator of the slip control system has an intermittently delivering hydraulic pump, and brake pressure variations caused thereby are used as the function signal of the second power brake pressure generator when generating a brake pressure via the second power brake pressure generator.

4. The method as recited in claim 1, wherein the method is applied only when electric or electronic function signals of the brake booster or the first power brake pressure generator or the second power brake pressure generator are absent.

5. The method as recited in claim 1, wherein the vehicle brake system has an electromechanical brake booster.

* * * * *